United States Patent Office 3,432,469
Patented Mar. 11, 1969

3,432,469
PROCESS FOR PRODUCING HIGH MOLECULAR WEIGHT POLYMERS FROM IMPURE 2,6-XYLENOL
Allan S. Hay, Schenectady, N.Y., assignor to General Electric Company, a corporation of New York
No Drawing. Filed Feb. 2, 1967, Ser. No. 613,439
U.S. Cl. 260—47         7 Claims
Int. Cl. C08g 23/18, 23/20

ABSTRACT OF THE DISCLOSURE

Impact of impurities in commercially available 2,6-xylenol on molecular weight of poly(2,6-dimethyl-1,4-phenylene ethers) made therefrom is overcome by a two step process whereby a low molecular weight polymer is first formed, isolated from the reaction mixture and then further polymerized to a higher molecular weight polymer.

---

This invention relates to a process of using impure 2,6-xylenol for the making of poly(2,6-dimethyl-1,4-phenylene ether), by a process which comprises first reacting the impure 2,6-xylenol with oxygen while dissolved in a solution of an amine-basic cupric salt complex to produce a low molecular weight polymer which either precipitates from the solution or can be precipitated from the solution in which the impurities or their oxidation products remain dissolved. After isolating the low molecular weight polymer, it is reoxidized with oxygen while dissolved in a solution of an amine-basic cupric salt complex to a polymer which has a higher molecular weight than can be produced in a one step oxidation of the impure 2,6-xylenol. To obtain the highest molecular weight polymer in the second step, a solvent for the reaction mixture should be one which will retain the polymer in solution during the polymer forming reaction. However, if it is desired to produce a polymer of a given molecular weight, the solvent system can be used which will precipitate the polymer when it has attained the desired molecular weight.

In my copending applications, Ser. Nos. 212,127, now U.S. Patent 3,306,874 and 212,128, now U.S. Patent 3,306,875, both filed July 24, 1962, and assigned to the same assignee as a present invention, I have disclosed that a broad class of phenols can be oxidized to poly(phenylene ethers) in a solution of an amine-basic cupric salt complex. When the amine of the complex is a primary or secondary amine, the phenols which can be used are limited to those having substituents in both ortho positions, whereas tertiary amines can be used as the amine in the complex when oxidizing a broader class of phenols, e.g., those which do or do not contain substituents in both ortho positions. Since 2,6-dimethylphenol, also known as 2,6-xylenol, has a methyl group in both ortho positions, it is one of the phenols that can be oxidized to a polymer, i.e., poly(2,6-dimethyl-1,4-phenylene ether), using primary, secondary or tertiary amines as the amine for forming the complex.

As disclosed in my copending application, Ser. No. 212,128, when phenols are used which have a substituent in one ortho position and the para position, i.e., the reaction in forming the poly(phenylene ether) occurs through the phenolic hydroxyl group and the ortho position, only low or intermediate molecular weight polymers are obtained. Therefore, when it is desired to produce very high molecular weight polyphenylene ethers, the phenols should contain a substituent in both ortho positions and the polymer forming reaction should occur through the phenolic hydroxyl group and the para position. This means that a phenol such as 2,4-xylenol does not produce as high molecular weight polyphenylene ethers as its isomer, 2,6-xylenol. Certain phenols, which can react both through the ortho and para positions, for example, phenol itself, o-cresol, 2,3- and 2,5-xylenol, etc., produce poly(phenylene ethers) with a three dimensional or branched chain structure under the usual polymerization conditions. Phenols which have substituents in the para and both ortho substituents, e.g., 2,4,6-trimethylphenol, although not capable of forming a polymer itself, will act as a chain terminating agent when present in phenols which are capable of forming a polymer. Commercially available 2,6-xylenol from coal tar is extremely difficult to purify beyond about 97% purity level, except by highly involved and expensive purification techniques. The impurities generally remaining are phenol, the three isomeric cresols, 2,4-, 2,5- and 3,5-xylenol, 2,4,6-trimethylphenol (mesitol) and a small amount of other high boiling materials. Commercially available synthetic 2,6-xylenol made by methylation of phenol or o-cresol, generally contains a slight amount of unreacted phenol, o-cresol, p-cresol, 2,4-xylenol and 2,4,6-trimethylphenol. Although the suppliers of both natural and synthetic 2,6-xylenol fractionally distill their product to remove a large proportion of these impurities, the final product still contains a small but significant quantity of them.

When such commercially available 2,6-xylenols are oxidized as disclosed in my above-identified copending applications, the effect of these impurities is evident by the fact that the final molecular weight of the polymer is markedly lower than the molecular weight of the polymer obtained under the same reaction conditions using very pure, 2,6-xylenol. For example, commercially available 2,6-xylenol from coal tar has a 2,6-xylenol content in the order of 95 to 99% and generally 97% and 98%. A polymer prepared from this 2,6-xylenol will generally have an intrinsic viscosity in the range of 0.4 to 0.5 deciliters per gram as measured in chloroform at 25° C. (0.4–0.5 dec. l./g., $CHCl_3$, 25° C.). For brevity hereinafter, the term "intrinsic" viscosity" will be used, it being understood that the units are deciliters per gram as determined in chloroform at 5° C., unless stated otherwise. Such a range of intrinsic viscosities corresponds to number average molecular weights in the range of 11,000 to 15,000 as determined by osmotic measurement for a linear polymer and a somewhat higher molecular weight if the polymer is branched. Under the same reaction conditions, very pure 2,6-xylenol (99+%) will produce polymer having intrinsic viscosities in the range of 0.8 and higher corresponding to number average molecular weight of 25,000 and higher.

In view of the very involved and expensive processing requiring to convert the commercially available natural and synthetic 2,6-xylenols to the very pure 2,6-xylenol necessary for making extremely high molecular weight poly(2,6-dimethyl-1,4-phenylene ether) it is highly desirable to develop a simple and inexpensive technique for purifying or to develop a method for using the commercially available 2,6-xylenols to make high molecular weight poly(2,6-dimethyl-1,4-phenylene ether). I have now discovered that commercially available 2,6-xylenol, containing from 1 to 5% by weight of other phenolic impurities, may be converted into higher molecular weight poly(2,6-dimethyl-1,4-phenylene ethers) than can be produced in a one step process by carrying out the oxidation in a two step process. In the first step the oxidation is carried out to a point where the polymer has an intrinsic viscosity in the range of 0.2 to 0.3 recovering the polymer from the reaction mixture and thereafter again oxidizing the recovered polymer to a high molecular weight polymer. By carrying the process out in two steps, the impurities in the initial 2,6-xylenol form extremely low molecular weight materials while the 2,6-xylenol forms a higher molecular weight material. If this process is stopped when the polymer from the 2,6-xylenol has an intrinsic viscosity of 0.2 to 0.3, the low molecular weight material from the impurities will not be precipitated with the polymer from the 2,6-xylenol and therefore will not be present in the second oxidation step to interfere with the polymer from the 2,6-xylenol being polymerized to higher molecular weight product. Surprisingly enough, very little of the 2,6-xylenol reacts with the other phenolic impurities thereby providing a very efficient and effective way of purifying the 2,6-xylenol during the polymerization process.

The first oxidation step may be carried out in either one of two ways. The reaction may be carried out in a homogeneous solution with the reaction being stopped when the polymer from the 2,6-xylenol is in the range of 0.2 to 0.3 thereafter adding a precipitating liquid to the homogeneous solution to cause the polymer from the 2,6-xylenol to be precipitated leaving behind in the solution the much lower molecular weight polymer from the impurities. In this case the intrinsic viscosity of the polymer can be conveniently monitored by noting the flow time of the solution in a calibrated pipette using a calibration chart which relates the flow time with the intrinsic viscosity of the polymer in solution.

A much more convenient means is to use a combination of a solvent and non-solvent for the polymer as the reaction medium which will be a solvent for the reaction mixture, but a non-solvent for the polymer after it has attained an intrinsic viscosity in the range of 0.2 to 0.3. Under these conditions, the desired polymer is readily removed by filtration from the balance of the reaction mixture and is ready for the second oxidation step.

Liquid aromatic hydrocarbons as well as substituted aromatic hydrocarbons, for example nitrobenzene, chlorobenzene, liquid chlorinated aliphatic hydrocarbon liquids and the amines used in the copper complex are excellent solvents, not only for the starting materials, but also for the high molecular weight polymers. Liquid aliphatic hydrocarbons and aliphatic alcohols are solvents for the starting materials, but non-solvents for the high molecular weight polymers. Mixtures of the liquid aromatic hydrocarbons or substituted aromatic hydrocarbons and the liquid alkanes or alkanols are ideal mixtures to use when it is desired to use a reaction mixture which will precipitate those polymers having intrinsic viscosities in the range of 0.2 to 0.3.

In general, a ratio of one part by volume of the solvent for the polymer to from 0.5 to 2.5 parts by volume of the non-solvent for the high polymer will provide a mixed solvent from which the polymer having intrinsic viscosities of 0.2 to 0.3 will precipitate. The actual ratio used is readily determined by the following procedure. High purity (>99%) 2,6-xylenol is oxidatively coupled to poly(2,6-dimethyl-1,4-phenylene ether). Samples are taken as the reaction proceeds. The polymer is isolated from each sample to obtain a series of polymers of different molecular weights. Molecular weights and intrinsic viscosities of these polymers are determined by well known techniques. Solutions of these polymers in the desired solvents are made and the non-solvent added until at least 80% of the polymer precipitates. Graphs of these data will provide a general range for each pair of solvent and non-solvent which will precipitate those polymers having intrinsic viscosities in the desired range.

Since the particular reaction conditions chosen, e.g., temperature, catalyst composition, catalyst concentration, etc., have some effect on the molecular weight of the polymer which precipitates from a particular composition of solvent and non-solvent, an oxidative coupling of impure 2,6-xylenol is carried out under the desired reaction conditions as a check. If the intrinsic viscosity of the polymer is too high, the ratio of non-solvent to solvent is increased. If the intrinsic viscosity is too low, the ratio of non-solvent to solvent is decreased. Generally a good approximation of the adjustment of the ratio can be obtained from the above graphical data and the amount by which the obtained intrinsic viscosity varied from that expected.

Liquid alkanols make excellent non-solvents to be used since they are miscible wtih water which is one of the by-products of the polymerization process. It is undesirable to permit the water to form a separate phase since it has a deleterious effect on the basic-cupric salt complex possibly due to extracting the catalyst into the aqueous phase and effectively removing it from the reaction zone. However, other means such as use of desiccants can be used to remove the water of reaction if a solvent system is used which is not miscible with the water formed. Most of the water is formed during the formation of the low molecular weight polymer, i.e., in the first step. Therefore the necessity of preventing the formation of an aqueous phase is not a problem in the second oxidation step.

The desirability of carrying out the polymerization reaction in the first step until the polymer has at least an intrinsic viscosity of 0.2 is to permit the polymer to be readily separated from the products formed from the impurities. The upper limit of an intrinsic viscosity of 0.3 is determined by the fact that if the polymerization reaction is carried beyond this point, some of the polymer from the impurities will start to be incorporated into the polymer molecule from the 2,6-xylenol, thereby influencing and decreasing the ultimate molecular weight obtainable from the recovered polymer.

The general method of carrying out my process, is to pass an oxygen containing gas through a solution of the impure 2,6-xylenol, said solution also containing dissolved therein a complex comprising at least one basic cupric salt and at least one amine. If the solvent used for making this solution is one in which the polymer from the 2,6-xylenol does not precipitate, the reaction must be monitored as mentioned above until the intrinsic viscosity of the polymer from the 2,6-xylenol is in the specified range. The reaction is then stopped by pouring the reaction mixture into a non-solvent, such as, an aliphatic alcohol, generally methanol, and preferably containing sufficient hydrochloric acid to react with and inactivate the catalyst. The polymer which precipitates is removed by filtration or centrifugation, washed to remove any adherent reaction solution. It is then ready to be reoxidized. When a solvent system is used in which the polymer precipitates, it is only necessary to filter off the precipitated polymer and wash it before it is used in the second step.

The second step is essentially a repeat of the first step except that it is now necessary to use a solvent which will at least dissolve the initial polymer and will also dissolve the amine-basic cupric salt complex. When it is desirable to limit the molecuar weight to something below the maximum obtainable, the same means as used in the first step may be used to monitor the molecular weight in the reaction mixture or to precipitate the polymer when it attains the desired molecular weight. In both steps of the reaction, the reaction of oxygen, either pure oxygen or that in the oxygen containing gas reacts with the 2,6-xylenol and other phenols present with the production of the oxidatively coupled products of the phenols and water as the by-product. This reaction is exothermic and is generally moderated so that the temperature does not exceed 50° C. and preferably 40° C. to minimize oxidation of some of the phenols to their corresponding diphenoquinones. In carrying out the second step of my process, I generally continue the passage of the oxygen or oxygen containing gas until the exothermic reaction has subsided, at which point the polymer, if it has not precipitated from solution already, is precipitated by pouring the reaction mixture into a liquid which is a non-solvent for the poly (2,6-dimethyl-1,4-phenylene ether), for example, a liquid alkane or alkanol, preferably methanol usually containing sufficient hydrochloric acid to insure inactivation of the copper catalyst.

As explained previously, the polymer produced in this two step process from impure 2,6-xylenol has much higher molecular weight than can be obtained from the same 2,6-xylenol by any variations of the one step process.

In providing the catalyst comprising a basic cupric salt and an amine, the particular copper salt used has no effect on the type of product obtained. I may start with either cuprous or cupric salt. The only requirement is that, if a cupric salt is used, it must be capable of existing in the cupric state and must form a complex with the amine that is soluble in the reaction medium. The necessity for being able to exist in the cupric state is based on my belief that the oxidation of the 2,6-xylenol is accomplished by the oxygen reacting with the amine-cuprous salt complex to form an intermediate activated amine-basic cupric salt complex which reacts with the hydroxyl groups of the phenols present to form an unstable intermediate which decomposes, forming the poly(phenylene ethers) corresponding to phenols present and water as the product and regenerates the amine-cuprous salt complex. This activated complex can also be formed by starting originally with the cupric salt in making the copper-amine complex, for example, by using a reducing agent which unites with the cupric ion and forms a cuprous salt in situ, e.g., copper metal. However, more simple methods may be used, for example, the activated complex may be formed by adding cupric hydroxide to a cupric salt, adding a base to a cupric salt, adding an alkaline salt of 2,6-xylenol, by treating a cupric salt with an ion exchange resin having exchangeable hydroxyl groups, etc. Preferably, these reactions are carried out in the presence of the amine to prevent precipitation of the basic cupric salt, but it is possible to add the amine later to dissolve the basic cupric salt even as a precipitate. As will be self evident, concerning cupric salt, the amount of hydroxyl ion introduced to form the basic cupric salt should not be sufficient to convert the cupric salt to cupric hydroxide, but merely sufficient to convert the cupric salt to the basic cupric salt, i.e., one hydroxyl group per copper atom.

Typical examples of the copper salts and the amines are those copper salts disclosed in my above-identified applications, Ser. Nos. 212,127 and 212,128, the tertiary amines disclosed in said Ser. No. 212,128 and the primary and secondary amines disclosed in said Ser. No. 212,127. In general, these amines are either heterocyclic amines, e.g., pyridine, or the substituents on the amine nitrogen are joined to the amine nitrogen through an aliphatic carbon atom, i.e., they are free of an aryl group directly attached to the amine nitrogen, e.g., alkylamines, aralkylamines, etc. All of these copper salts and all of these amines including primary, secondary and tertiary amines are likewise disclosed in my issued Patent 3,294,760. The disclosures of these applications and patent are hereby incorporated by reference. The amine-basic cupric salt complex used in both steps of the reaction may be the same in both steps.

From an economical consideration, the available cupric and cuprous salts of mineral acids are desirable because of their cheapness and suitability. Of these, the cuprous halides, especially cuprous chloride and cuprous bromide are preferred. In the first step of the reaction, where the impure 2,6-xylenol is being oxidized there is an advantage to using the lower alkyl primary or secondary amines since they are readily available and cheap in cost. There is an added advantage in that primary and secondary amines, i.e., those amines having at least one hydrogen directly bonded to the amine nitrogen, will react with those phenolic impurities containing an unsubstituted ortho position to form amine containing oxygenated products which are incapable of being oxidized further to polymers. These amines, therefore, further inactivate these impurities from being incorporated in the polymer molecule and aid in their removal as soluble products from the precipitated polymers. Since primary and secondary amines cannot react with 2,6-xylenol and its polymer, this reaction of the amines does not interfere with the polymer formation from the 2,6-xylenol. Therefore, in the first step, although it is not necessary, there is a decided advantage, and I prefer to use primary or secondary amines, as the amine in forming the amine-basic cupric salt complex used in the first step.

In the second step, where it is desired to produce polymers with the highest molecular weight possible, the tertairy amines are to be preferred and especially a mixture of a tertiary mono amine and a tertiary diamine having from two to three carbon atoms between the two tertiary amine groups. This leads to the highest molecular weight polymers, but is not essential for the overall process. Tertiary amines may be used in the first step and primary or secondary amines may be used in the second step to obtain the desired high molecular weight products.

Further details for carrying out the actual oxidation processes will be apparent from the following examples, as well as reference to the above-mentioned copending applications.

In order that those skilled in the art may better understand my invention, the following examples are given which are illustrative of the practice of my invention and are not intended for purposes of limitation. In all of the examples, all parts are by weight unless stated otherwise.

Example 1

A calibrated pipette was made to follow the intrinsic viscosity during the reaction period by taking a 4 ml. pipette and scribing a line below the bulb. This pipette was calibrated by determining the length of time for solutions of poly(2,6-dimethyl-1,4-phenylene ethers) of different intrinsic viscosities to flow between the two marks on the pipette at different temperatures. Calibration curves were then drawn for each temperature to relate the flow time vs. the known intrinsic viscosities. In making the calibration curves, the weight of the polymer in the solution was essentially the same as the concentration of the polymer would be in the polymer forming reactions. By taking samples during a polymer forming reaction while using this pipette method, isolating the polymers, and determining their intrinsic viscosity by the standard procedure, showed that the accuracy of the calibration curve was within $\pm.04$ dec. l./g. up to intrinsic viscosities of 1.0 with most of the determinations being within the limit of $\pm 0.02$ dec. l./g., thus showing that the pipette method could be used in following the change in intrinsic viscosity during the reaction.

A commercially available 2,6-xylenol from coal tar was analyzed by vapor phase chromatography and found to contain 97.1% 2,6-xylenol, 1.7% phenol and o-cresol, 0.8% meta and para cresol and 2,4- and 2,5-xylenol, 0.3% 3,5-xylenol and 2,4,6-trimethyl phenol and 0.1% of other high boiling material. A solution of 10 g. of this impure 2,6-xylenol, 0.116 g. of tetramethylethylenediamine, 0.472 g. of trimethylamine and 0.099 g. of cuprous chloride was prepared in 140 ml. of toluene. To the solution, 5 g. of anhydrous magnesium sulfate was added as a desiccant to absorb the water formed. This solution was placed in a reaction flask equipped with a vibrating stirrer, oxygen inlet tube and a thermometer. The reaction flask was immersed in a 30° C. constant temperature bath. Oxygen was passed into the vigorously agitated solution at a rate of 190 cc. per minute. The change of intrinsic viscosity with reaction time was followed by using the calibrated pipette. At the end of 10 minutes, the intrinsic viscosity was 0.2 increasing to 0.29 after 16 minutes, 0.38 after 30 minutes, 0.43 after 57 minutes and 0.45 at the end of 77 minutes. A graph of these data showed that the intrinsic viscosity had essentially leveled off at the end of 78 minutes and would not increase significantly on further reaction.

This impure 2,6-xylenol was then purified to a purity of 99.4%. When this pure 2,6-xylenol was oxidized in the same manner as described above, the intrinsic viscosity was 0.44 after 15 minutes, 0.76 after 30 minutes, and 0.91 after 40 minutes. A graph of these data showed no sign that the maximum intrinsic viscosity had been reached at this time.

This example therefore shows the marked influence of impurities on the intrinsic viscosity of the polymer.

Example 2

This example illustrates the two step process, whereby in the first step, the solvent system is used which causes precipitation of the polymer when it attains an intrinsic viscosity in the range of 0.2 to 0.3. Since there is some possibility that the polymer in precipitating may carry down some of the copper catalyst by occlusion, a modification in the apparatus was made to minimize the effect of any loss in catalyst. A three compartment reactor was used with an oxygen inlet and vibrating stirrer in each of the three compartments. The reaction mixture was prepared containing all the reactants and stored in a reservoir under nitrogen and then introduced into the first reactor compartment where it flowed by gravity into the second compartment, with the second compartment overflowing into the third compartment, which in turn overflowed to the product collection vessel. The total volume was approximately 150 ml. equally distributed between the three reaction zones. Prior to the addition of the reaction mixture, a 100 ml. of the same solvent mixture present in the reaction mixture was introduced into the reactor. The reaction mixture was prepared in a two liter separatory funnel maintaining a nitrogen atmosphere. The reaction mixture contained 105 g. of the impure 2,6-xylenol of Example 1, 5.4 g. of dimethylamine and 3 g. of cuprous chloride dissolved in 735 ml. of toluene and 735 ml. of isopropanol. This mixture was added dropwise to the reactor at an initial rate of approximately 12 ml./min. with oxygen being introduced into each of the three reaction zones. At the end of 14 minutes, a polymer had started to precipitate in the third reaction zone. During the addition period, precipitate formed in the second and the third reaction zones, but not in the first reaction zone. All of the reaction mixture had been added at the end of 195 minutes. The reaction was continued for an additional 9 minutes, by which time, precipitate had now formed in the first reaction zone. The reaction mixture remaining in the reactor was added to the reaction mixture which had overflowed from the reactor during the addition period. The precipitated polymer was filtered from the reaction mixture and washed with methanol containing a few ml. of concentrated hydrochloric acid and then suspended in another portion of acidified hot methanol. A yield of 60.4 g. of polymer was obtained having an intrinsic viscosity of 0.26.

The filtrate was poured into excess methanol acidified with concentrated hydrochloric acid to precipitate the polymer from the 2,6-xylenol which had remained in solution. A yield of 15.1 g. of polymer was obtained having an intrinsic viscosity 0.19, illustrating that the intrinsic viscosity in this solvent system would have had to exceed 0.2 in order to precipitate from the solution.

These two polymers were reoxidized by dissolving 10 g. of each in separate portions of 150 ml. of toluene, also containing dissolved 0.1 g. of cuprous chloride, 0.15 ml. of tetramethylethylenediamine and 0.36 g. of trimethylamine, using the same procedure as used in Example 1. The polymer which had precipitated during the first step of the reaction required only 34 minutes for the exothermic reaction to subside, whereas, the polymer which was obtained from the filtrate required 90 minutes for the exothermic reaction to subside. The polymer recovered from each of these reaction mixtures had an intrinsic viscosity of 0.92 for the former and 0.96 for the latter. The polymer recovered in each case was cast into very strong flexible films. The film from the polymer obtained by reoxidation of the polymer recovered from the filtrate had a slight yellow color indicating that a slight amount of impurities had been incorporated into polymer structure, probably because of coprecipitation during the isolation of the polymer from the filtrate in the first step.

Example 3

Example 2 was repeated except in this case the mixed solvent was 840 ml. of toluene and 630 ml. of isopropanol. This decrease in the amount of isopropanol permits a slightly higher molecular weight polymer to be formed before it precipitates from the reaction mixture. This same ratio of toluene and isopropanol was used in providing the 100 ml. of the solvent which was added to the reaction vessel. In order to cut down on the addition time, 25 ml. of the reaction mixture was added initially and thereafter dropwise to the reactor. This causes somewhat more vigorous reaction to occur in the first stage of the reactor necessitating cooling to prevent the exothermic reaction from exceeding 40° C. The polymer started to precipitate in the third zone of the reactor at the end of 17 minutes with the addition being completed in 167 minutes. After completion of the addition, the reaction was continued for 15 minutes by which time polymer had formed in the first zone of the reactor.

The total reaction mixture including that remaining in the reactor was combined and then diluted by adding a volume of isopropanol equal to the volume of the reaction mixture and 12.2 ml. of concentrated aqueous hydrochloric acid. After stirring the reaction mixture was filtered with the filtrate being washed with methanol as in Example 2. The yield of polymer in this case was 100.3 g. having an intrinsic viscosity of 0.29, thus illustrating that a higher yield of polymer may be obtained when the intrinsic viscosity of the polymer in the first step of the reaction is near the upper limit of 0.30. This polymer when reoxidized as in Example 2, produced a colorless polymer having an intrinsic viscosity of 0.88 requiring 60 minutes for the exothermic reaction to subside.

Because of their excellent physical, mechanical, chemical, electrical and thermal properties, the polymers of this invention have many and varied uses, as disclosed in my above-mentioned copending applications, Ser. Nos. 212,127 and 212,128. For example, they can be used in molding powder formulations either alone or mixed with other polymers and may contain various fillers to make molded parts. They can also be used to prepare molded or extruded articles, films, coatings, threads, filaments, tapes and the like. The films may be axially oriented in either one or both directions if desired and the films whether oriented or not are useful in the making of electrical insulating tapes, sound recording tapes, magnetic tapes, photographic film, etc. The filaments or fibers so produced may also be axially oriented if desired and whether oriented or not can be woven into fabrics useful as filter cloths because of their high chemical and heat resistance or may be used for making laminates or woven fabrics for wearing apparel.

In light of the above teachings, it is obvious that other modifications and variations of the present invention are possible. It is, therefore, to be understood that changes may be made in the particular embodiments of the invention described which are within the full intended scope of the invention as defined by the appended claims.

What I claim as new and desire to secure by patent of the United States is:

1. The process of increasing the molecular weight of the poly(2,6-dimethyl-1,4-phenylene ether) obtained by oxidatively coupling of impure 2,6-xylenol containing a total amount of phenols, other than the 2,6-xylenol of from 1 to 5% by weight that are not readily separable by distillation, which comprises (a) reacting oxygen with the impure 2,6-xylenol while the latter is dissolved in a solution of an amine-basic cupric salt complex, until the polymer formed from the 2,6-xylenol has an intrinsic viscosity of from about 0.2 to 0.3 dec. l./g. as measured in chloroform at 25° C. (b) isolating the 2,6-xylenol polymer from the reaction mixture containing low molecular weight products of the impurities, and (c) dissolving the isolated polymer in a solution of an amine-basic cupric salt complex and reacting the polymer in solution with oxygen, thereby obtaining a higher molecular weight poly(2,6-dimethyl-1,4-phenylene ether) than can be obtained directly from the impure 2,6-xylenol, the amine of said complex of (a) and (c) being free of aryl substituents directly bonded to the amine nitrogen.

2. The process of claim 1 wherein the solvent used in step (a) is a non-solvent for the polymer having an intrinsic viscosity of from 0.2 to 0.3 so that it precipitates from the reaction mixture.

3. The process of claim 1 wherein the solvent used in step (a) is a mixture of a liquid aromatic hydrocarbon and a liquid alkanol in which the polymer having an intrinsic viscosity of from about 0.2 to 0.3 is insoluble and precipitates from the reaction mixture.

4. The process of claim 1 wherein the solvent of step (a) comprises (1) a mixture of a liquid hydrocarbon selected from the group consisting of benzene, toluene, xylene and mixtures thereof, and (2) a liquid alkanol selected from the group consisting of methanol, ethanol, propanol, isopropanol and mixtures thereof.

5. The process of claim 1 wherein the amine-basic cupric salt complex is a complex of a basic cupric halide selected from the group consisting of basic cupric chloride and basic cupric bromide and an amine selected from the group consisting of alkyl primary monoamines, alkyl secondary monoamines, alkyl tertiary monoamines, saturated aliphatic hydrocarbon tertiary diamines, saturated aliphatic hydrocarbon tertiary triamines and mixtures thereof.

6. The process of claim 1 wherein the amine-basic cupric salt complex used in the reaction as defined by (a) is an amine having at least one hydrogen directly bonded to the amine nitrogen.

7. The process of claim 1 wherein the amine in the amine-basic salt complex used in the reaction as defined in (a) is an amine having at least one hydrogen directly bonded to the amine nitrogen and the amine in the amine-basic cupric salt complex used in the reaction as defined in (c) is a mixture of a tertiary monamine and a tertiary diamine having two to three carbon atoms between the two tertiary amine groups.

References Cited

UNITED STATES PATENTS

| | | | |
|---|---|---|---|
| 3,313,776 | 4/1967 | Borman | 260—47 |
| 3,325,451 | 6/1967 | Blanchard | 260—47 |

FOREIGN PATENTS 930,993 7/1963 Great Britain.

WILLIAM H. SHORT, *Primary Examiner.*

M. GOLDSTEIN, *Assistant Examiner.*